UNITED STATES PATENT OFFICE.

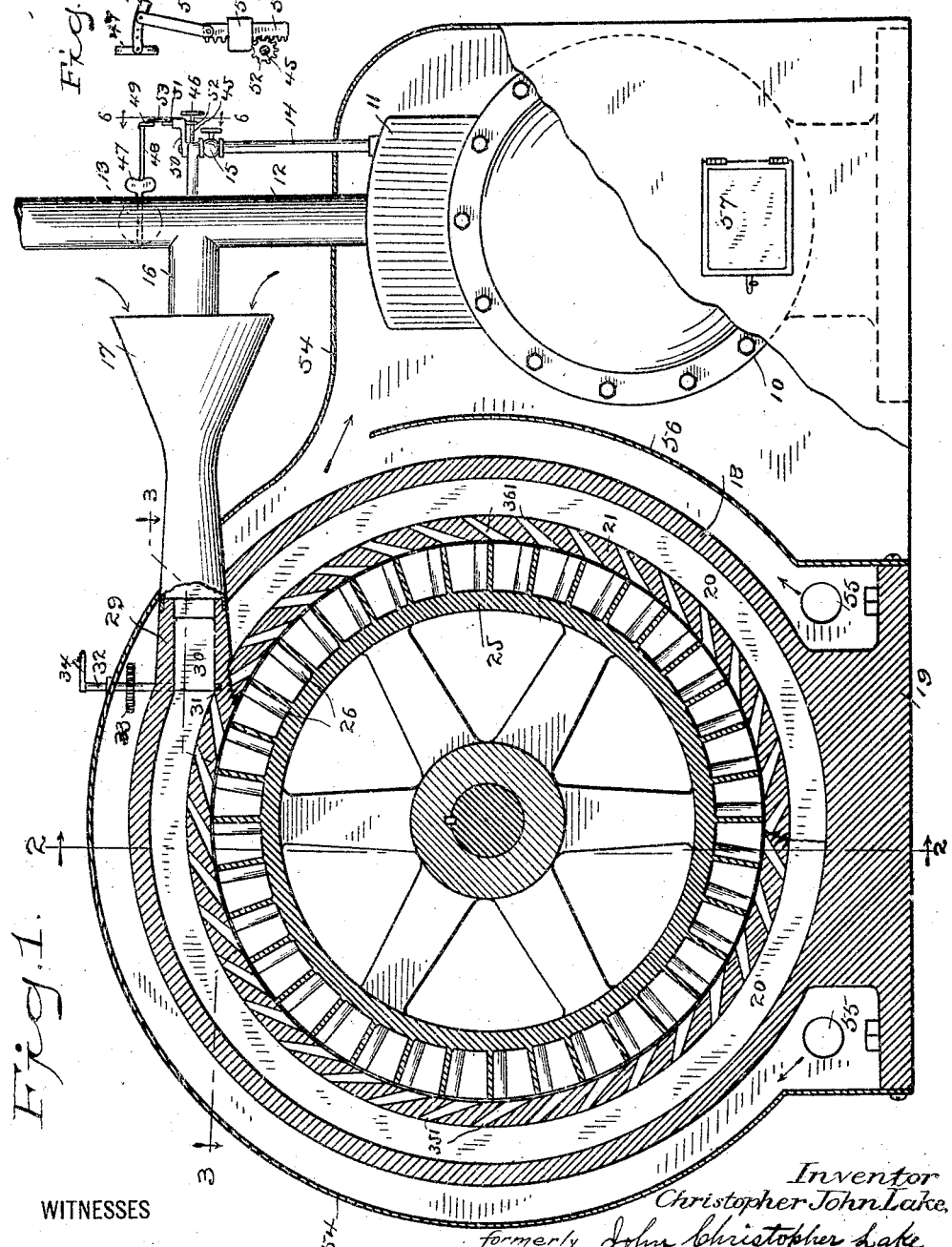

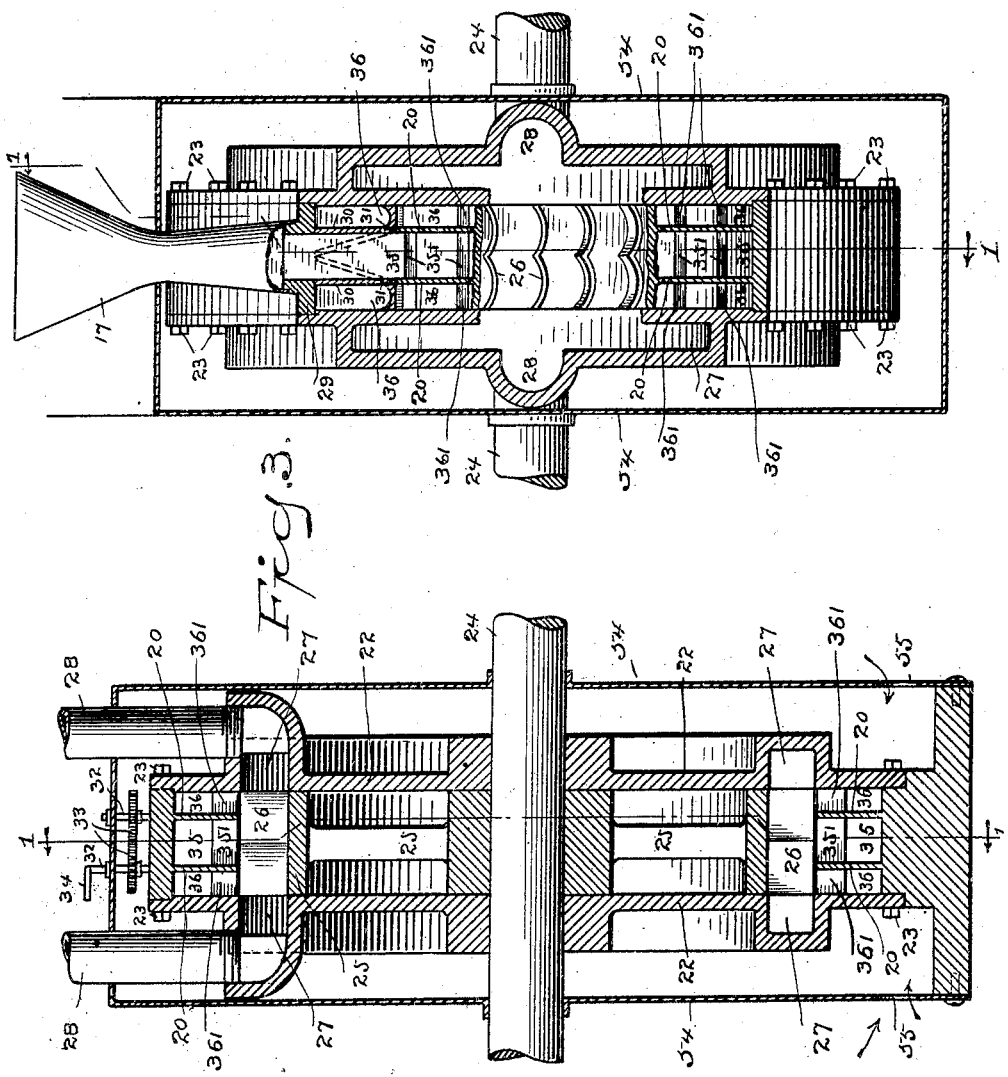

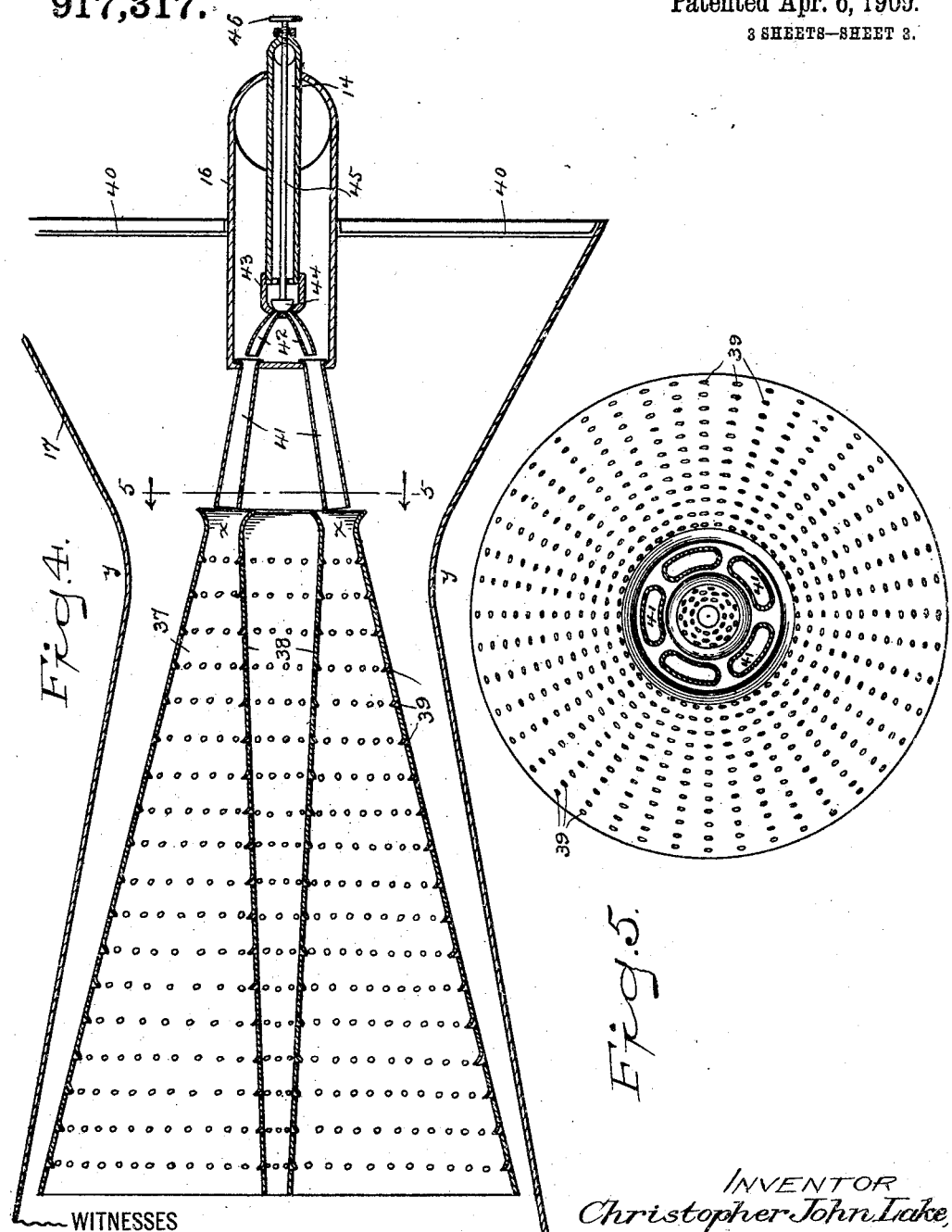

CHRISTOPHER JOHN LAKE, (NAME CHANGED FROM JOHN CHRISTOPHER LAKE BY JUDICIAL ORDER,) OF BRIDGEPORT, CONNECTICUT.

AIR-ENGINE.

No. 917,317.  Specification of Letters Patent.  Patented April 6, 1909.

Application filed July 14, 1905, Serial No. 269,629. Renewed September 22, 1908. Serial No. 454,156.

*To all whom it may concern:*

Be it known that I, CHRISTOPHER JOHN LAKE, (formerly JOHN CHRISTOPHER LAKE,) a citizen of the United States, and resident of Bridgeport, in the county of Fairfield and State of Connecticut, have invented certain new and useful Improvements in Air-Engines, of which the following is a specification.

This invention relates to means or apparatus for converting the energy of an expansive fluid, such as steam, into work through the medium of a rotary-wheel having blades or wings of the type known as rotary engines. In carrying out my invention however, I do not employ the steam in such manner as to impinge directly upon the blades or wings of the rotary engine or wheel, but only to produce a current of air of such quantity and force as to practically take up or dissipate the steam and act upon said blades or wings in the same manner as "wind." The engine may therefore be termed a "wind engine" or air engine.

In existing systems of applying heat energy to work, only about 10% of the energy is turned into work and 90% goes to waste. In the heat engines in which the heat is applied direct in the engine, the radiation is so intense, that water-jackets or air cooling must be resorted to, which alone causes a direct loss of over 40% besides the loss at exhaust and other radiations. In the steam engine, the only heat utilized for work is that which is transmitted to the water with no attempt to utilize the direct or prime heat of combustion, which goes direct out of the stack to waste, as does also the heat that radiates from the boiler and the engine and that which escapes at the exhaust. Thus each system attempts to use what the other wastes. I obviate these losses of the heat energy by first transferring all the forces of the heat elements into a large volume of air in motion which assumes and conserves the heat and converts it into another form of motive force, represented by volume and velocity instead of by pressure due to its temperature; thus the volume of air and its velocity supersedes the original force, while the temperature is reduced according to the volume of air introduced, which is energized to its maximum velocity, and minimum temperature, and then used for any power purposes or in an engine or motor without radiation or loss of heat with the exhaust. Thus all the heat energy is utilized in putting the air in motion to form an air current having a force, according to its volume and velocity; and as such air current can be used in an engine with about 88% efficiency, while steam efficiency in an engine is only about 10% of the heat energy, the great advantage of my system of first transferring the heat energy into air currents and then using said currents as motive power, is apparent.

One of the objects of my invention is to utilize the steam energy of a very high pressure impulse, to put or force a large volume of air into motion with a velocity force commensurate with the steam energy, and subsequently use this air in motion (or air currents) as motive force for power purposes in substitution of the steam direct.

A further object is to combine and utilize both the heat or energy of the steam and the prime or direct heat of combustion contained in the stack gases, and to so utilize the steam conjointly with the stack gases that the energy of both will be converted into work.

A further object is to provide for the conjoint operation of a damper or shut-off in the stack or chimney from the boiler with the steam throttle, so that when the throttle valve is closed, the damper will be open in the stack so as to allow the fire to burn in the ordinary way, and when the throttle is open, the damper in the stack will be closed when the steam will dominate and cause the whole combustion elements to exert force and perform work with the force of all the heat elements conserved and united.

A further object is to so employ the steam as to augment the furnace draft and induce or draw air through an outer casing which incloses the boiler, the engine and the exhaust pipe thereof, thence through the furnace where the air will be highly heated before reaching the steam to which it will deliver its heat with a consequent drying effect and which will, in turn, by its pressure and velocity, impel the air commingled with itself into a power fluid of large volume and velocity.

To these ends, the invention consists in the construction and combination of parts substantially as hereinafter described and claimed.

Of the accompanying drawings: Figure 1 represents an elevation, partly in section and partly broken away, of the various parts of an apparatus embodying my invention, the general line of section through the rotary engine being indicated by the dotted lines 1—1 in Figs. 2 and 3. In said Fig. 1 however, a portion of the port ring at the right is shown as broken away to indicate a section through the port ring in a different plane: Fig. 2 represents a section on line 2—2 of Fig. 1: Fig. 3 represents a section on line 3—3 of Fig. 1: Fig. 4 represents an enlarged view, in longitudinal section, of a form of funnel which may be employed for securing the assimilation of the steam and air at the point of entrance to the engine, the form shown in said Fig. 4 differing slightly in external shape from that represented in Figs. 1 and 3: Fig. 5 represents a section on line 5—5 of Fig. 4: Fig. 6 represents an enlarged detail elevation, on line 6—6 of Fig. 1, of the connections between the steam throttle-valve stem and the damper in the smoke-stack of the furnace.

Similar reference characters indicate the same or similar parts throughout the several views.

A furnace and boiler of a conventional type are represented at 10, said boiler having a steam dome 11 and the smoke-stack 12 of the furnace being provided with a damper 13. A steam pipe 14, having a globe valve 15, leads from the steam dome into a branch 16 of the smoke-stack, said branch 16 projecting into the mouth 17 of the funnel which will be fully described hereinafter.

The circular casting or casing 18 of the engine is supported on a suitable base 19, and is formed or provided with two inwardly projecting annular partitions 20. The port ring 21 is supported by the partitions and may be cast integral therewith and with the casing 18. The side plates 22 are secured to the circular casing by bolts 23 and are formed with bearings for the shaft 24 of the rotary wheel 25, the latter having vanes or blades 26. The form of these blades will be understood by comparing Figs. 1 and 3, but such form may be variously modified. The side plates are formed with annular internal grooves forming exhaust channels 27 the upper portions of which communicate with exhaust pipes 28. Said exhaust channels are opposite the edges of the blades 26 as shown in Fig. 2.

As shown in Fig. 1, the casing 18 and port ring 21 are interrupted in their circular continuity by a tangential extension forming an inlet 29 to which the funnel or nozzle is connected. In said inlet two gates 30 are pivoted at 31 (see also Fig. 3) and are provided with shafts 32 in line with their pivots, said shafts having pinions 33 meshing with each other, and one of said shafts having an operating crank or handle 34 by means of which the gates may be swung from the position shown by full lines in Fig. 3 to the position indicated by dotted lines, or vice versa, to direct the current of impelling fluid from the nozzle either solely into the annular space 35 between the two partitions 20 or to the two annular spaces 36 around the outside of said partitions.

The port ring 21 is formed with three rows of ports leading in from the three annular spaces 35, 36. Said ports are smallest at their ends where the fluid enters them and largest at their inner ends to spread the fluid against the blades and prevent choking of the ports. The ports 351 of the central row are inclined in the direction shown in the left-hand portion of Fig. 1, and the ports 361 of the outer or side rows are inclined in the opposite direction, as shown in the right hand portion of said figure. When the gates 30 are in the full line position of Fig. 3, the fluid is directed solely into the space between the two partitions 20 and from there must pass through the ports 351 and impinge upon the double concave sides or faces of the blades and rotate the wheel in the direction which, in practice, will be considered the forward motion. The fluid then escapes into the exhaust channels 27 and from there out through the pipes 28. To reverse the engine, gates 30 are swung to the dotted line position in Fig. 3 so as to meet at their free edges, and the fluid is then deflected into the two side chambers 36 from whence it can only escape through the backwardly inclined ports 361 (see Fig. 1) and impinge upon the double convex faces of the blades, rotating the wheel backward, and exhausting, as before, through the channels 27 and pipes 28.

I shall now describe the most important feature or features of my invention, which are comprised in the arrangement and construction of the funnel or nozzle, although it is to be understood that I am not limited to the particular form and details of the embodiment which I have chosen to illustrate in this application.

The funnel or nozzle is connected to the inlet 29 and within its main or outer casing are two perforated shells, one within the other. The outer perforated shell 37 flares and the inner perforated shell 38 contracts in the direction of the passage of the fluid, and the perforations 39 are inclined in the direction indicated in Fig. 4. The smaller end of the shell 37 is bent outward or flares somewhat, and the larger end of the shell 38 is bent similarly in an opposite direction so that a contracted annular throat is formed between these two shells at about the point $x$. The outer casing of the nozzle or funnel is itself contracted as at $y$, to form what may be termed its throat, but the annular space between said casing and the perforated shell gradually tapers from the throat $y$ to the delivery end of the nozzle, and in the opposite direction the casing flares more abruptly to form the mouth 17 of the funnel. This mouth end of the funnel may be supported by suitable stays 40 connecting it with the branch 16 of the smoke-stack. Pipes 41 extend from the closed end of the branch 16 to points to deliver jets of fluid into the throat *x* of the perforated shells, drawing in or entraining air from the mouth 17 of the funnel as it so passes. These pipes or conduits 41 may, if desired, be perforated in a manner similar to the shells 37, 38, so as to entrain air through the walls thereof by the velocity of the fluid passing through them. Steam nozzles 42 are connected to the steam-supply pipe 14 and terminate a slight distance short of the entrance ends of the conduits or pipes 41 so that as jets of steam are delivered by the steam nozzles into said conduits, such jets will entrain products of combustion from the branch 16 and, augmented thereby, be transmitted through the conduits 41 as jets of combined steam and hot gases from the furnace, and then, passing into the throat *x* and moving with great velocity through the flaring annular space between the two perforated shells, entrain more air through the inclined openings 39 and assimilate therewith. Such air is drawn not only from the space around the outer perforated shell but also from the space within the inner perforated shell, for air from the funnel mouth 17 passes between the conduits 41. The high temperature of the steam and furnace gases, being taken up by the air thoroughly assimilated therewith, expands the air and imparts increased velocity and momentum thereto as the fluid for actuating the engine. The difficult point to overcome in constructing a practical and successful apparatus on this principle is to cause the heat force to actuate and energize a sufficiently large volume of air to conserve the heat and transfer it into velocity, because the rapidly moving steam tends to jump or pass the inert air before the air will be drawn in and attain the same velocity therewith, through an air opening which restricts the volume of air contact with the steam. In other words, it is difficult and heretofore has been impossible to assimilate and transfer any considerable steam or heat force at high temperature and pressure into the force of air in motion at a considerably lower temperature. Hence, to accomplish this result, I have invented what I term a steam and air "assimilator", which gives supplemental impulses to the air and imparts the maximum velocity with minimum temperature. This assimilator, as shown in Fig. 4, comprises an outer funnel casing having its mouth enlarged to measure or determine the volume of air to be influenced by the action set up by the steam within, the contraction or throat *y* of said casing serving to increase the air flow and concentrate it into the steam domain.

As shown in Fig. 4, the steam-supply pipe 14 is fitted with a tip or cap 43 which carries the steam nozzles, said tip having a concave inner face. A convex faced throttle-valve 44, adapted to simultaneously close or open the entrances or ports of all the nozzles 42, is provided with a stem 45 passing through a suitable stuffing box and also through a threaded opening of the steam pipe. Said stem is threaded and provided with an operating handle or knob 46 by which the throttle-valve may be actuated to control the passage of steam through the nozzles 42.

I prefer to employ means whereby the movement of the throttle-valve may actuate the damper, since it is desirable that the damper be open when the throttle is closed, and closed when the throttle is open. For when no furnace gases are being drawn off and used as a part of the motive power for the engine, some draft must be provided for the furnace. And when the furnace gases are drawn through the branch 16, it is desirable that the damper be closed to avoid down-draft through the upper part of the smoke-stack. The connections which I have shown for doing this, are detachable however, so that if desired the damper may be independently controlled or set by hand. And they are also adjustable to permit the amount of movement of the damper by the throttle to be varied. As shown in Figs. 1 and 6, the damper 13 has a hand piece 47 and an extended axis or stem 48, the latter having a curved arm 49 provided with a series of holes along its length. A bracket 50 is suitably secured, as to the steam pipe 14, and is formed with a vertical guideway for a rack 51 meshing with a pinion 52 secured on the stem 45 of the throttle-valve. A link 53 is pivoted to the upper end of the rack and is connected to the arm 49 of the damper-stem by a suitable pin which may connect said link with any one of the holes in said arm. By removing said pin, the parts are disconnected, and by changing it from one hole to another in the arm 49, the amount of damper-swing that will be imparted by a given amount of throttle-action will be varied.

A sheet metal casing 54 incloses the engine, furnace and boiler, and is provided with air-inlet holes 55 near the base of the engine. A partition 56 extends between the engine and the furnace nearly to the top of the casing. The front of the latter is provided with a door 57 by means of which, when open, fuel may be supplied to the inclosed furnace. In the drawings I do not show the openings which are necessarily employed to admit air to support combustion in the furnace, as said openings are concealed by the casing 54. As all air passing to the furnace must come from the space within the casing 54, said air prevents radiation of heat outside the casing from the inclosed apparatus, and being heated to a considerable degree by carrying off the radiated heat from the inclosed apparatus, aids in attaining a high temperature of steam and furnace gases passing to the assimilator. The partition 56 causes the air entering on one side of the engine to circulate or pass up close to said engine until it escapes over the top of said partition.

The operation of the motor will now be understood without further detailed description thereof. The artificially produced air currents are caused to be forced through the engine wheel against one side of the blades only, the aperture to each blade being not large enough to allow the moving air to enter and fill and choke the passage between the blades and thus retard the velocity and produce back pressure against the after or oncoming blade; and so long as the velocity of the air current is greater than the travel of the wheel blades, it will impinge against the forward blade and transmit its velocity force thereto in line of wheel rotation without any back pressure.

I am able to get a relatively large volume of free or normal air entrapped or influenced by means of the large funnel opening which also concentrates and conveys the air into the space in which the steam dominates with increasing velocity as concentration takes place on its approach to the steam contact. Thus the funnel is an essential as its size at the mouth determines the volume of air taken in as the steam pressure and temperature determines the velocity of the volume according to the completeness of their assimilation. The numerous air inlets of the steam expanding nozzles distribute the air to the steam in minute streams so as to facilitate perfect assimilation during the process of steam expansion from the point of high pressure to the full or maximum velocity.

Having now described an embodiment of my invention, although without attempting to point out all of the ways in which it may be carried into effect, I declare that what I claim is:

1. The combination with an engine and a furnace and boiler, of a casing inclosing them, and means for drawing air from the space within the casing through the furnace and forcing it with steam from the boiler and gases from the furnace through the engine.

2. In an apparatus of the character described, the combination of a furnace smokestack having a branch, a funnel inclosing said branch, a steam pipe leading into said branch, means whereby steam from said pipe will entrain air and furnace gases and deliver them through the funnel as a power fluid, and a motor having movable members to receive the impact of said power fluid.

3. In an apparatus of the character described, the combination of a furnace smokestack having a branch, a funnel inclosing said branch, a steam pipe leading into said branch, means whereby steam from said pipe will entrain air and furnace gases and deliver them through the funnel, the entrance end of the funnel being flaring whereby the steam and gases will entrain air in large volume as a power fluid, and a motor having movable members to receive the impact of said power fluid.

4. Means for producing an aeriform current for obtaining power, comprising a tubular casing having a contracted intermediate portion, a flaring perforated shell within said casing, a tapering perforated shell within the flaring shell, and means for delivering high pressure steam between said perforated shells.

5. Means for producing an aeriform current for obtaining power, comprising a tubular casing having a contracted intermediate portion, a flaring perforated shell within said casing, a tapering perforated shell within the flaring shell, and means for delivering high pressure steam between said perforated shells, the perforations in the shells being inclined in the direction of flow of the power fluid.

6. The combination with a funnel or nozzle casing, of perforated shells concentrically mounted therein, a smoke-pipe branch extending into the casing, conduits leading from said branch to the annular space at the entrance end of said shells, nozzles adapted to deliver steam to said conduits and means for supplying steam variably to said nozzles.

7. The combination with a steam boiler, furnace and smoke pipe of means for producing a composite power fluid, said means comprising a steam jet nozzle in the smoke-pipe of the furnace and a funnel or casing surrounding said smoke-pipe and nozzle and adapted to mingle air with the steam and furnace gases from the smoke-pipe.

8. The combination of a steam boiler and furnace; a smoke pipe from said furnace; a branch from said smoke pipe; a steam pipe from said boiler; a nozzle on said steam pipe located within said branch; and automatic means whereby the smoke pipe is closed when the steam pipe is open and opened when the steam pipe is closed.

9. The combination of a steam boiler and furnace with an impact motor; a casing surrounding said boiler, furnace and motor and means for conducting air from said casing to the furnace.

10. The combination of a steam boiler and furnace with an impact motor; a casing surrounding said boiler, furnace and motor; means for conducting air from said casing to the furnace and means for mixing air and furnace gases with the steam and conducting the same to the motor.

11. The combination of a steam boiler and furnace with an impact motor; a steam pipe from said boiler; a nozzle on said steam pipe; a smoke pipe from said furnace; a branch from said smoke pipe surrounding said nozzle; a funnel or nozzle casing surrounding said nozzle and branch and adapted to receive steam air and furnace gases, the air and furnace gases being forced therein by the steam issuing from the nozzle; and means for conducting the steam air and furnace gases to the motor.

In testimony whereof I affix my signature, in presence of two witnesses.

CHRISTOPHER JOHN LAKE,
(FORMERLY JOHN CHRISTOPHER LAKE.)

Witnesses:
 A. M. WOOSTER
 S. W. ATHERTON.